United States Patent [19]
Ladd et al.

[11] Patent Number: 6,097,791
[45] Date of Patent: Aug. 1, 2000

[54] VOICE-MESSAGING SYSTEM WITH NON-USER OUTCALLING AND AUTO-PROVISIONING CAPABILITIES

[75] Inventors: David J. Ladd, Saratoga, Calif.; Henry C. A. Hyde-Thomson, London, United Kingdom; Reid Thomas, Issaquah, Wash.

[73] Assignee: Octel Communications Corporation, Milpitas, Calif.

[21] Appl. No.: 08/892,644

[22] Filed: Jul. 15, 1997

[51] Int. Cl.[7] .................................................. H04M 1/64
[52] U.S. Cl. ................................ 379/88.19; 379/88.12; 379/88.22; 379/207
[58] Field of Search ................................ 379/67.1, 88.12, 379/88.17, 88.19, 88.2, 88.22, 88.25, 88.26, 91.01, 201, 207, 211

[56] References Cited

U.S. PATENT DOCUMENTS

| | | | |
|---|---|---|---|
| 4,697,282 | 9/1987 | Winter et al. | 379/67 |
| 4,739,509 | 4/1988 | Bourg | 379/93 |
| 4,761,807 | 8/1988 | Matthews et al. | 379/89 |
| 4,837,798 | 6/1989 | Cohen et al. | 379/88 |
| 4,926,462 | 5/1990 | Ladd et al. | 379/67 |
| 4,996,704 | 2/1991 | Brunson | 379/67 |
| 4,998,272 | 3/1991 | Hawkins, Jr. et al. | 379/88 |
| 5,008,835 | 4/1991 | Jachmann et al. | 364/513.5 |
| 5,008,926 | 4/1991 | Misholi | 379/89 |
| 5,117,451 | 5/1992 | Ladd et al. | 379/67 |
| 5,136,648 | 8/1992 | Olson et al. | 380/50 |
| 5,179,585 | 1/1993 | MacMillan, Jr. et al. | 379/88 |
| 5,247,497 | 9/1993 | Cohn | 369/26 |
| 5,301,226 | 4/1994 | Olson et al. | 379/67 |
| 5,491,742 | 2/1996 | Harper et al. | 379/201 |
| 5,535,264 | 7/1996 | Starr et al. | 379/89 |
| 5,557,659 | 9/1996 | Hyde-Thomson | 379/88 |
| 5,644,619 | 7/1997 | Farris et al. | 379/201 |
| 5,745,553 | 4/1998 | Mirville et al. | 379/201 |
| 5,764,732 | 6/1998 | Lubachevsky | 379/67 |
| 5,771,273 | 6/1998 | McAllister et al. | 379/67 |
| 5,787,150 | 7/1998 | Reiman et al. | 379/67 |
| 5,793,858 | 9/1998 | Meubus et al. | 379/210 |

FOREIGN PATENT DOCUMENTS

| | | | |
|---|---|---|---|
| 19598/83 | 4/1984 | Australia | H04M 3/50 |
| WO 92/15166 | 9/1992 | WIPO | H04M 1/64 |

OTHER PUBLICATIONS

"A Voice Password System For Access Security," Martha Birnbaum, Larry A. Cohen, and Frank X. Welsh, At&T Technical Journal, vol. 65, No. 5, pp. 68–74, Sep./Oct. 1986.
"A Case of Member's Management in a Multi–Media Mail System," Katsuki Morimoto et al., IEICE Technical Report (Japan), SE 87–1, pp. 1–6, Apr. 1987 (with translation).

*Primary Examiner*—Scott Weaver
*Attorney, Agent, or Firm*—Haverstock & Owens LLP

[57] ABSTRACT

A voice messaging system with non-user outcalling and auto-provisioning capabilities including an automatic means for configuring a telephone number to become a subscriber to a voice messaging service. The voice messaging system of the present invention facilitates the process of acquiring a voice mailbox by providing non-user outcalling and auto-provisioning. A voice messaging service user will be able to send a non-user voice messages using the voice messaging service, and, the non-user recipient desiring to subscribe to voice mailbox service can acquire a voice mailbox simply by responding to interactive queries after the reception of the voice message. The system also automatically establishes call forwarding at the appropriate central office switch and automatically creates a voice mailbox at the voice messaging system if a non-user recipient desires to become a subscriber to the voice messaging system.

31 Claims, 10 Drawing Sheets

VOICE-MESSAGING SYSTEM WITH NON-USER OUTCALLING AND AUTO-PROVISIONING CAPABILITIES

FIELD OF THE INVENTION

The present invention relates to the field of telecommunications equipment. More particularly, the present invention relates to the field of telephone voice processing systems with voice mail forwarding and provisioning of voice store facilities.

BACKGROUND OF THE INVENTION

Voice messaging systems (VMS) are well known, widely used and accepted for answering telephone calls directed to a person who is unavailable, either because that person is away from their telephone or on another call. For many VMS systems, when a VMS answers a telephone call from a calling party, the calling party is presented with a variety of options including the option of leaving a voice message at the called party's voice mailbox.

Another typical use of a conventional VMS is for sending and receiving messages between users of the system. A user is a person that has subscribed to the VMS and has a voice mail box. In order to send and receive messages to other users, such a user calls into the system, logs into his own mailbox and is then able to create and send messages to other mailboxes within the system. Such a VMS also allows users to send the same message to multiple mailboxes within the VMS, to reply to received messages, and to forward messages with comments to other mailboxes within the system.

FIG. 1 illustrates a block diagram of a conventional VMS. As shown, a VMS 102 is coupled to a central office switch (CO) 106 by a number of telephone lines 104. A subscribing user telephone 120 is registered within a user directory 125 of the VMS 102, and is assigned a voice mailbox 124. The CO 106 is configured to automatically forward calls to the VMS 102 in the event that the user telephone 120 is unanswered. The non-user telephone 170 is unknown to the VMS 106, and, accordingly, unanswered calls directed to it are not forwarded to the VMS 106. A non-user is a person that has not obtained a voice mail box in the VMS 106.

FIG. 2 illustrates a flow chart for one prior art mode of operation for using the VMS 106 of FIG. 1 to record and send a message. First, a user telephone calls the VMS (box 202), logs into his voice mailbox (box 204), records a voice message (box 206), and enters a telephone number of an intended recipient (box 208). If the intended recipient is a user, the VMS deposits the voice message in the recipient's voice mailbox (boxes 210 and 214). The VMS then notifies the recipient of the impending message (box 216). The intended recipient can thereafter call into the VMS and access the voice message (box 218). On the other hand, if the intended recipient is a non-user, the VMS will return the recorded message to the sender (box 212).

Although widely accepted for commercial use, centralized voice messaging technology has had only moderate success in the residential market. Tremendous effort has been expended by telephone companies to market voice messaging service to the general public. Numerous television and radio advertisements have been aired to teach consumers that they can use these systems to not just answer calls, but to send, receive, reply, and forward voice messages, and to broadcast a single voice message to multiple recipients. Nevertheless, such voice messaging systems are not widely used among residential customers.

One reason voice messaging systems have not gained in popularity among residential customers is that many residential customers already own and are using answering machines. Another reason is that prior art voice messaging systems will only send messages from a user of the VMS to other users of the VMS who have their own established voice mailboxes. Users to the VMS are not able to send a voice message to a non-user. Thus, a user will have to keep calling to communicate with a non-user who is not home and who does not have an answering machine. This inability to direct messages to non-users of the VMS, combined with the small number of residential voice messaging system users, greatly undermines the potential utility of the VMS.

Several voice messaging systems, such as the Octel Sierra, manufactured by Octel Communications Corporation of Milpitas, Calif., are designed to solve this problem. Such systems are equipped with a feature called non-user out calling. This feature allows a user of a VMS to call once to record the message and the voice messaging system will repeatedly call the recipient until either the message is delivered or the pre-determined number of unsuccessful attempts is reached.

However, it can be appreciated that further improvements are needed in such a system. For example, a non-user recipient of such a voice message may desire to routinely receive voice messages but may be unable or unfamiliar with a procedure for acquiring such a service. What is needed is a method and an apparatus to facilitate the voice mailbox assignment process and assist interested non-users in automatically acquiring mailboxes. What is further needed is a VMS that will automatically establish forwarding links at central office switches and automatically create voice mailboxes for new users.

SUMMARY OF THE INVENTION

A voice messaging system with non-user outcalling and auto-provisioning capabilities according to the present invention provides the ability for an existing VMS user to send a voice message to a telephone number of someone who is not a voice mailbox user and to automatically provide the message recipient with the option to acquire a voice mailbox. According to a preferred embodiment of the invention, the voice messaging system, upon receiving a message request directed to a non-user, repeatedly dials the telephone number of the non-user until a telephone connection is established. Once a telephone connection is established, the voice messaging system ascertains whether the connection is established with a live person or an answering machine. If it is a live person, the VMS then transmits a recorded message to the recipient including an offer for acquiring a voice mail box, after which the message recipient can acquire a voice mailbox by correctly responding to prompts and providing information using the telephone dialing pad.

If the message recipient chooses to sign up for a voice mailbox, the VMS then automatically transmits a command to a provisioning computer, which in turn instructs an appropriate CO to set up call forwarding for the telephone number of the new user. The provisioning computer also transmits a command to the VMS to set up a new voice mailbox for the message recipient.

In accordance with an alternate embodiment of the invention, when delivering a recorded voice message to a recipient connected to a second CO, a first VMS transmits the recorded voice message to a second VMS via a series of telephone switches or via an optional digital or analog connection. The voice message can also be transmitted from one VMS to another via a VMS networking service such as OcteLink, provided by Octel Communications Corporation of Milpitas, Calif. The second VMS, which is coupled to the second CO and a second provisioning computer, then carries out the messaging and provisioning functions as described above.

In accordance with a further alternate embodiment of the invention, the VMS sets up a voice mailbox at another VMS through a remote provisioning system (RPS). The RPS, upon receiving the recipient's telephone number, determines which VMS and CO serve the telephone number, and then transmits the telephone number to a provisioning computer coupled to the appropriate VMS and CO. The provisioning computer then instructs the VMS to establish a voice mailbox and the CO to establish call forwarding links corresponding to the recipient's telephone number.

DETAILED DESCRIPTION OF THE PREFERRED EMBODIMENT

Figure 1:
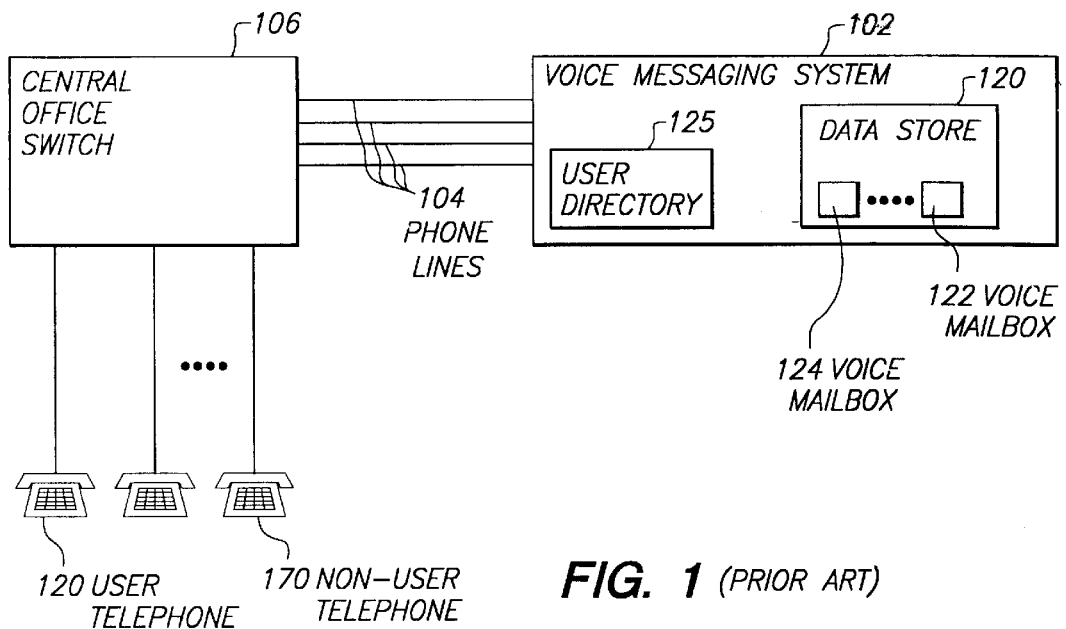
FIG. 1 shows a block diagram of a prior art VMS interconnected in a telecommunications network.
Figure 3:
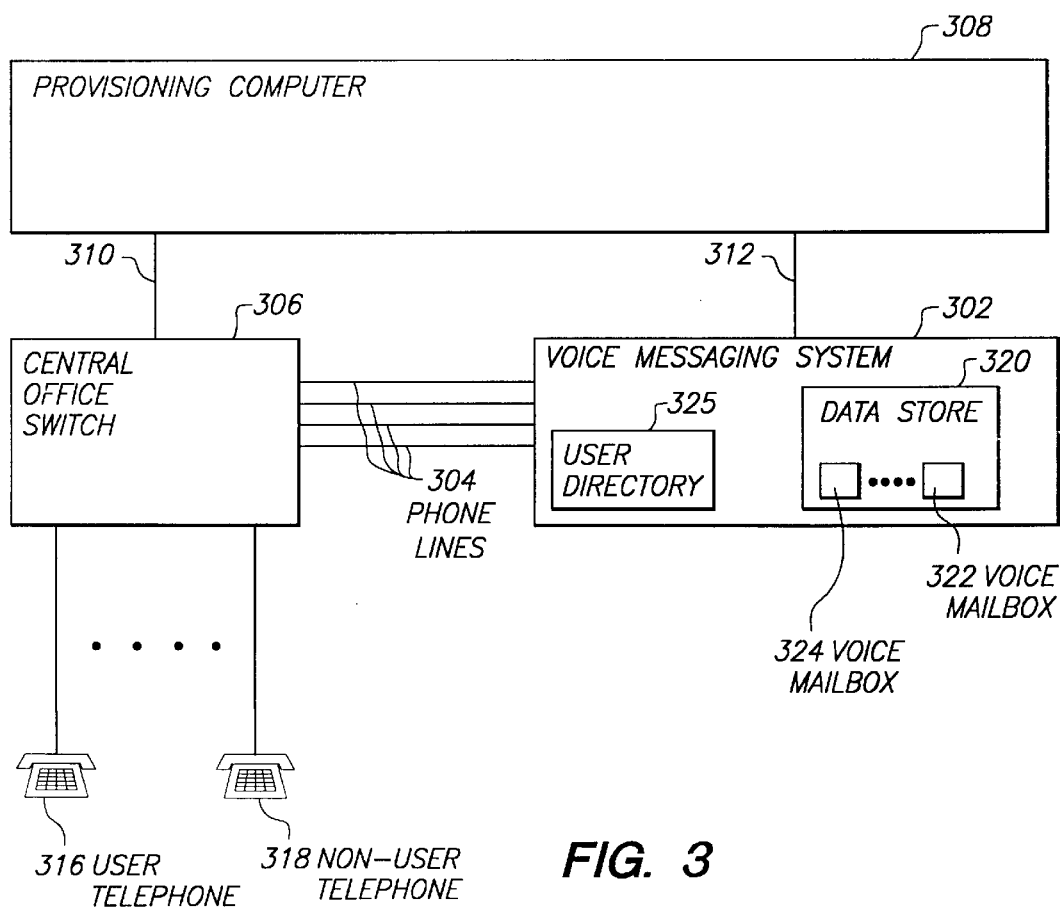
FIG. 3 shows a block diagram of a preferred embodiment of the present invention.
Figure 2:
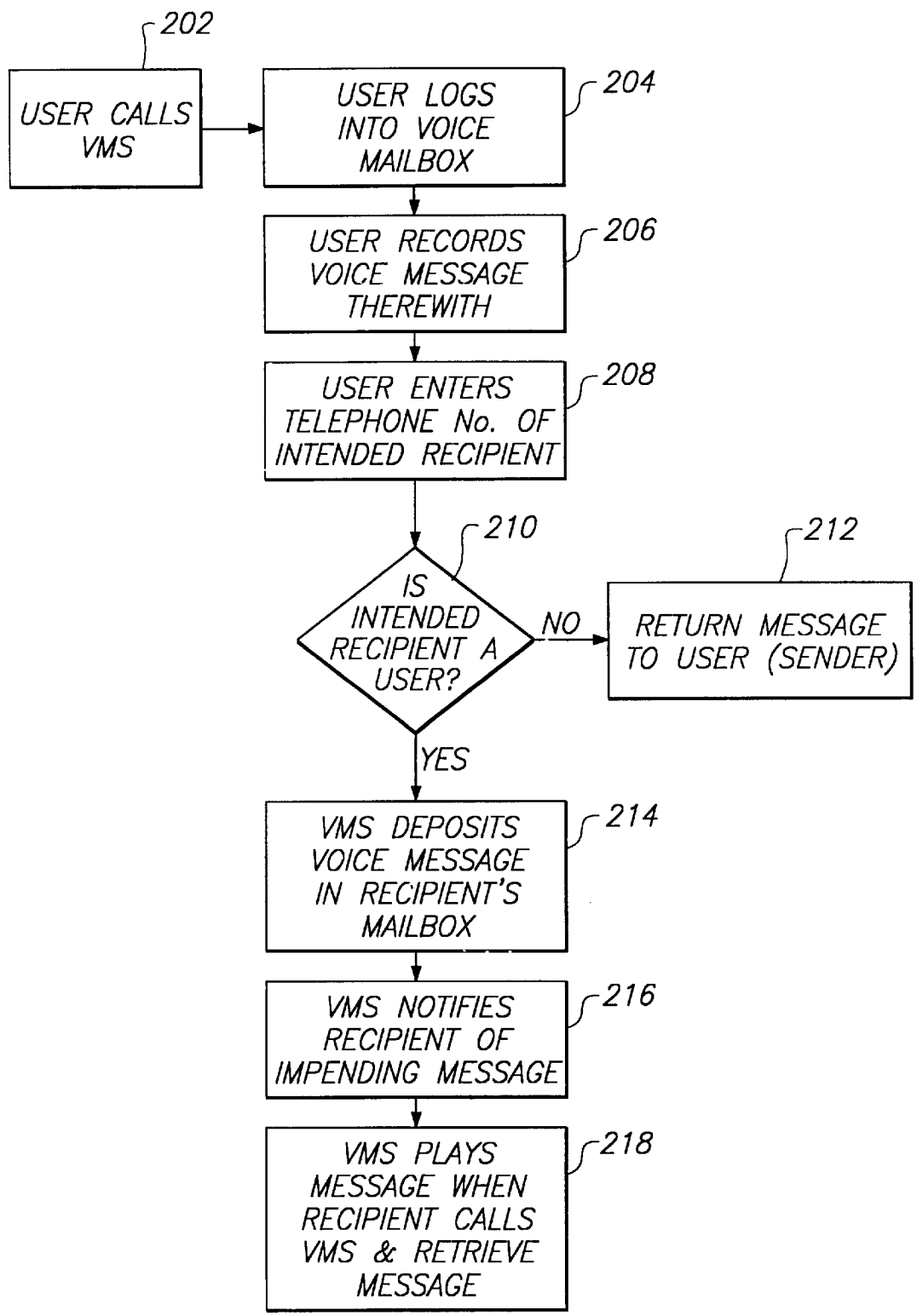
FIG. 2 shows a flow chart illustrating the operation of a prior art VMS.

FIG. 3 illustrates a representative configuration of a VMS and a provisioning computer of the present invention within a telecommunications network. A VMS 302 is coupled to a CO 306 by a number of telephone lines 304. The CO 306 serves a plurality of telephones including a user telephone 316 and a non-user telephone 318. The telephone number of the user telephone 316 is registered in a user directory 325 of the VMS 302, and is associated with a voice mailbox 322 in a data store 320 within the VMS 302. Furthermore, the CO 306 will automatically forward calls intended for the user telephone 316 to the VMS 302 in the event that the telephone 316 is unanswered in a pre-determined number of rings or off hook, as described above. The telephone number of the non-user telephone 318 is not registered with the VMS 302, and calls directed to the non-user telephone 318 which are unanswered or placed when the telephone 318 is off-hook are not forwarded by the CO 306 to the VMS 302.

A provisioning computer 308 is bi-directionally coupled to the VMS 302 via communications paths 312, and is further coupled to the CO 306 via communications path 310. Upon receiving auto-provisioning commands from the VMS 302, the provisioning computer 308 sends instructions to the CO 306 by way of the communications path 310 for automatically setting up call-forwarding for a specified telephone number, as will be described below. The provisioning computer 308 also sends instructions to the VMS 302, by way of the communications path 312, to create a new voice mailbox 324, corresponding to the specified telephone number, in a data store 320, within the VMS 302. Subsequently, a new entry is added to the user directory 325 at the VMS 302 when the new voice mailbox 324 is created. It should be noted that the provisioning computer 308 does not need to be a stand alone unit as suggested by FIG. 3. A provisioning computer can also be contained within the VMS.

Figure 4A:
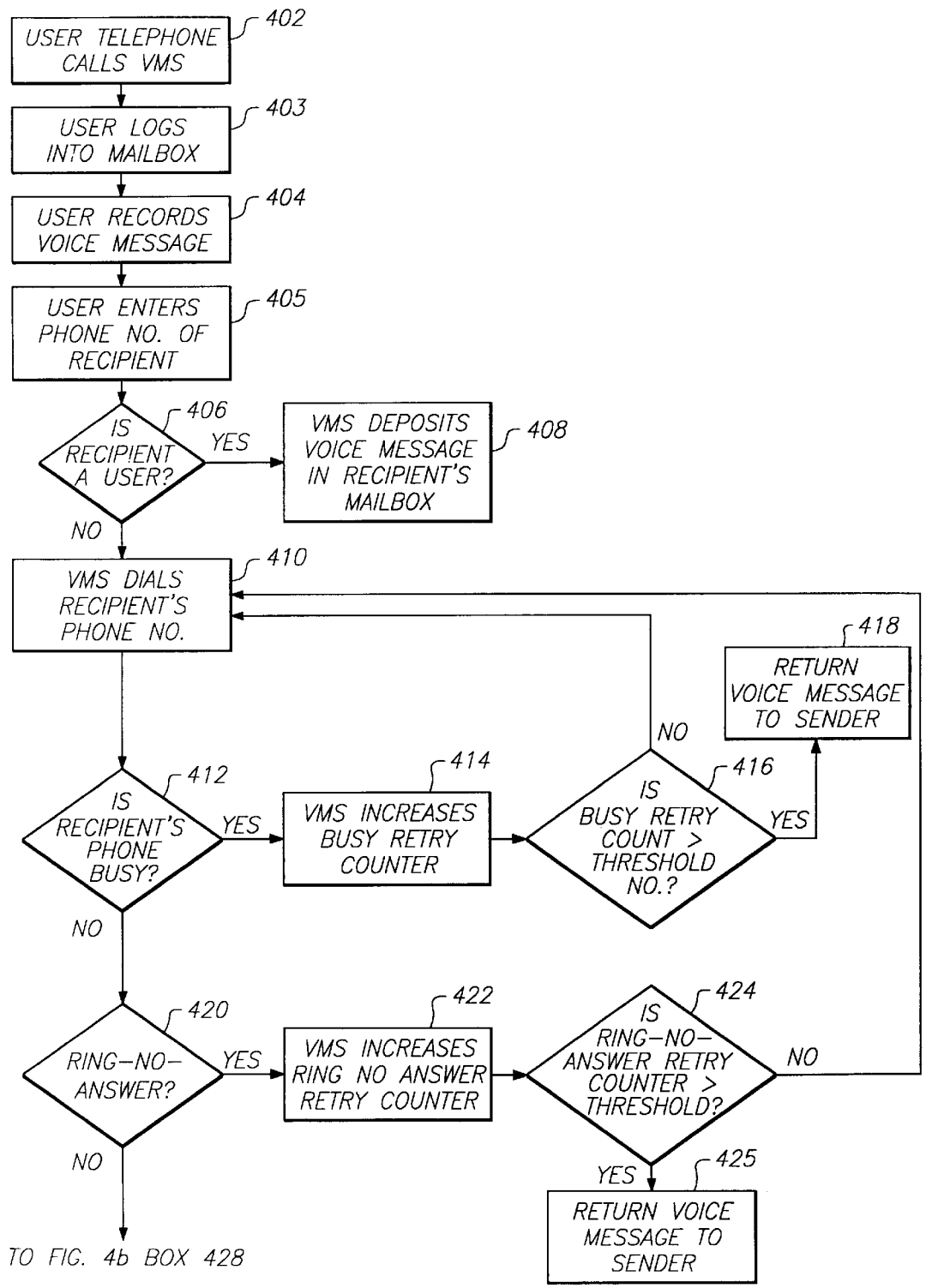
FIGS. 4a and 4b show flow charts illustrating the function of non-user outcalling and auto-provisioning according to the present invention.
Figure 4B:
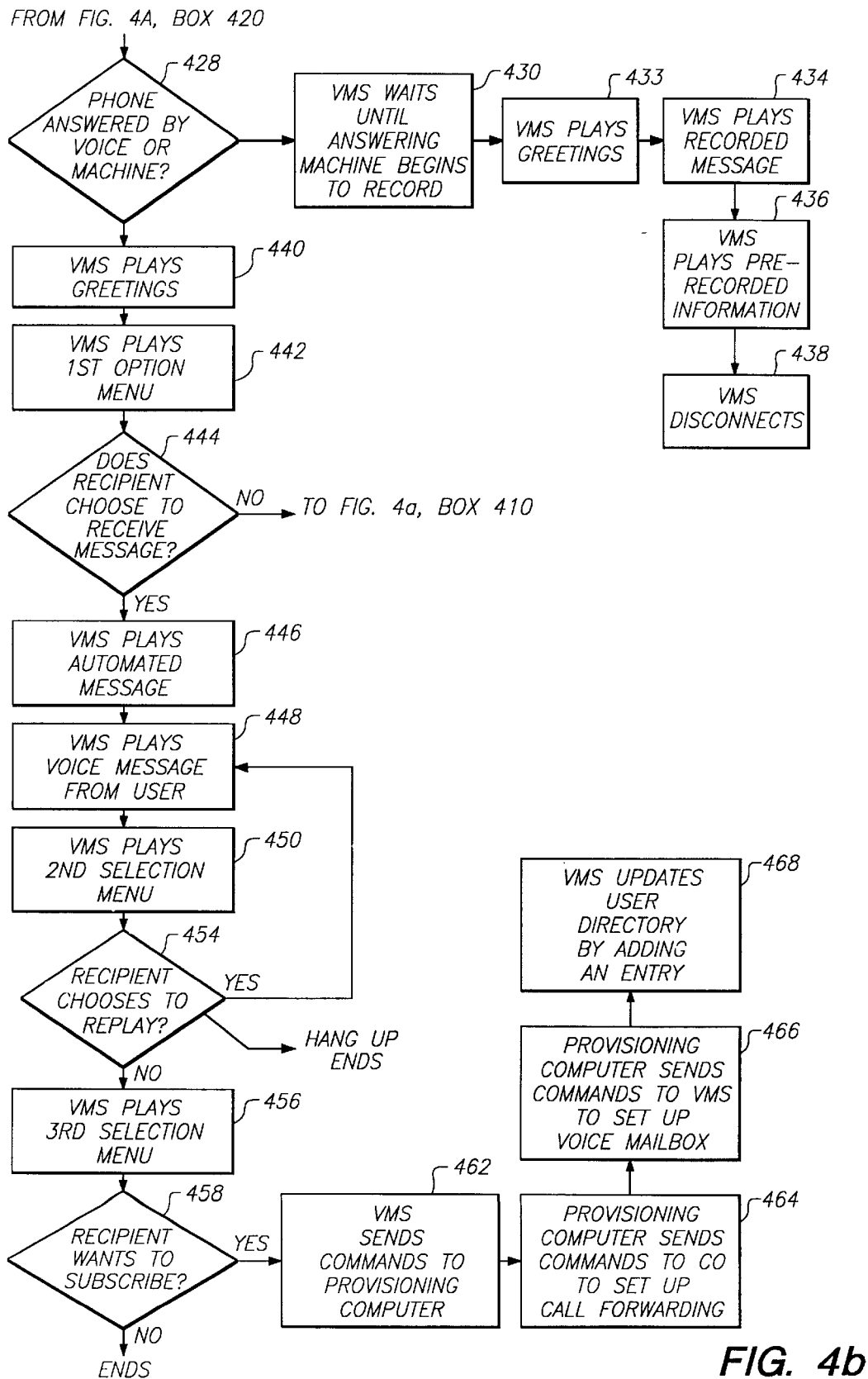

FIGS. 4a and 4b illustrate flow charts showing the function of non-user outcalling and the function of auto-provisioning according to the present invention. These flow charts are best understood when read in conjunction with the preferred configuration illustrated in FIG. 3. FIGS. 4a and 4b illustrate the steps necessary for the VMS 302 to automatically add a non-user telephone number to the CO 306 and create a new voice mailbox for that telephone number in the VMS 302. According to FIG. 4a, a user calls the VMS 302 (box 402), logs into his mailbox 322 (box 403) and records a voice message therewith (box 404). The user then enters a telephone number of an intended recipient, which is also stored in the mailbox 322 in association with the voice message (box 405). The voice message and the telephone number are preferably recorded in machine readable form within the data store 320. Alternatively, the voice message and the telephone number are recorded in any appropriate manner apparent to one skilled in the art. The VMS 302 then looks up the intended recipient's number in the user directory 325 to determine if the intended recipient has a mailbox within the VMS 302 (box 406). The step of determining if the intended recipient has a mailbox can be carried out by a comparing unit well known in the prior art. If the intended recipient has a mailbox, the VMS 302 transfers the voice message to the intended recipient's voice mailbox using methods known in the prior art (box 408).

If the intended recipient does not have a mailbox, the VMS 302 goes off hook and dials the number of the non-user telephone (box 410). The VMS 302 then determines if the non-user telephone 318 is off-hook (box 412). If the non-user telephone 318 is off hook, the VMS 302 then increments a busy retry counter (box 414). The VMS 302 then determines if the count on the busy retry counter exceeds a pre-determined threshold number (box 416). If the threshold number is not exceeded, the VMS 302 then waits for a pre-determined period of time, and the process is branched back to re-attempt the call (box 410). If the threshold number is exceeded, the message is returned to the sender's mailbox 322 with a notice of non-delivery (box 418). It will be readily understood by persons of ordinary skill in the art that a threshold number can be entered into the counter and the counter decremented with each attempt and still fall within these teachings.

If the non-user telephone is not off hook, the VMS 302 determines if the telephone 318 is not answered within a pre-determined period of time (box 420). If the VMS 302 determines that the non-user telephone 318 is not answered within the predetermined period of time or a predetermined number of rings, the VMS 302 then disconnects and increments a ring-no-answer retry counter (box 422). The VMS 302 then determines if the count on the ring-no-answer retry counter exceeds a second pre-determined threshold number (box 424). If the second threshold number is not exceeded, the VMS 302 then waits for a pre-determined period of time, and the process is branched back to re-attempt the call (box 410). If the threshold number is exceeded, the message is returned to the sender's mailbox 322 with a notice of non-delivery (box 425). In the preferred embodiment, the waiting period for the ring-no-answer situation is longer than that for the busy situation because it is presumed that the recipient is not near the telephone and a longer delay is likely until such a call would be answered.

If the intended recipient's telephone is answered, the VMS 302 determines if it is a live person answering or an answering machine (box 428). If the VMS 302 determines that the intended recipient's telephone is answered by an answering machine, it waits until the answering machine begins to record (box 430) and then plays a pre-recorded greeting (box 433) and the voice message recorded by the user (box 434). After the recorded voice message is played, the VMS 302 plays a pre-recorded informational message comprising information about voice mailbox service, and a brief instruction message explaining how to acquire a voice mailbox (box 436). Thereafter, the VMS 302 disconnects (box 438) and the process ends.

If the VMS 302 determines that the telephone is answered by a live person, it plays an automated voice message to the person regarding the pending message (box 440) and also provides the person with a selection menu (box 442). The automated voice message and the selection menu can be implemented with a telephone interactive query system well known in the art. In the preferred embodiment of the invention, the selection menu provides the person answering the telephone with the option of listening to the message or hanging up the phone and not listening to the message. The automated message includes the available options as well as the code to input for selection of each option. The automated message preferably includes information such as, "This is an automated voice messaging system calling with a voice message from '(name of sender)'. To accept the message now, press '1', to receive the message later, please hang up." If the user hangs-up or does not press '1' in a pre-determined period of time (box 444), the process is branched back to the box 410 to re-attempt the call at a later time (box 410). If the recipient presses '1', the VMS 302 plays an automated message confirming the choice (box 446). The automated message preferably includes the text such as, "The message will now be played, at the end of the message you will be offered additional options." The voice message from the sender is then played for the person on the telephone (box 448).

After the recorded message is played, the VMS 302 then plays an automated voice message including a second selection menu (box 450). In the preferred embodiment, the selection menu provides the person on the phone the options of listening to the message again, obtaining information on how to sign up for voice messaging service, and terminating the call. The automated message preferably includes the text such as, "To hear the message again press '1', to obtain information on signing up for a voice messaging service which would allow you to receive this message in your own secure voice mailbox, press '2', to terminate this call simply hang up." The VMS 302 then determines if the person hangs up or enters a response (box 454). If the person then presses '1', the message is replayed (box 448). If the user presses '2', the VMS 302 plays yet another automated message including a third selection menu (box 456). In the preferred embodiment, the third selection menu provides the recipient the options of automatically signing up for voice messaging service and terminating the call. The automated message accompanying the third selection menu preferably includes the text such as, "A secure voice mailbox will allow you to not only receive messages when your phone is busy or is not answered, but it will also let you send messages to any telephone number as well as receive messages like this one without ringing your phone, and let you reply to a message without calling back the sender. The cost is $X.XX (amount) per month for this service. If you would like to automatically subscribe for this service, press '1', otherwise just hang up."

The VMS 302 determines if the person then hangs up or enters a response (box 458). If the recipient chooses to automatically sign up for a secure voice mailbox, the VMS 302 sends a message that contains the new subscriber's telephone number to the provisioning computer 308 by way of the communications path 312 (box 462). The provisioning computer 308 then sends an appropriate message command to the CO 306 to set up call forwarding for the new subscriber telephone (box 464). The provisioning computer 308 also sends another appropriate command to the VMS 302 to set up a new voice mailbox 324 in the data store 320 within the VMS 302 for the new subscriber's telephone number (box 466). The VMS 302 also updates the user directory 325 by adding a new directory entry when the new voice mailbox is created (box 468). In this manner, a recipient of a message who is not a user of the VMS 302 delivering the message is presented with the opportunity to automatically become a user of the VMS 302 after receiving their message.

Figure 5:
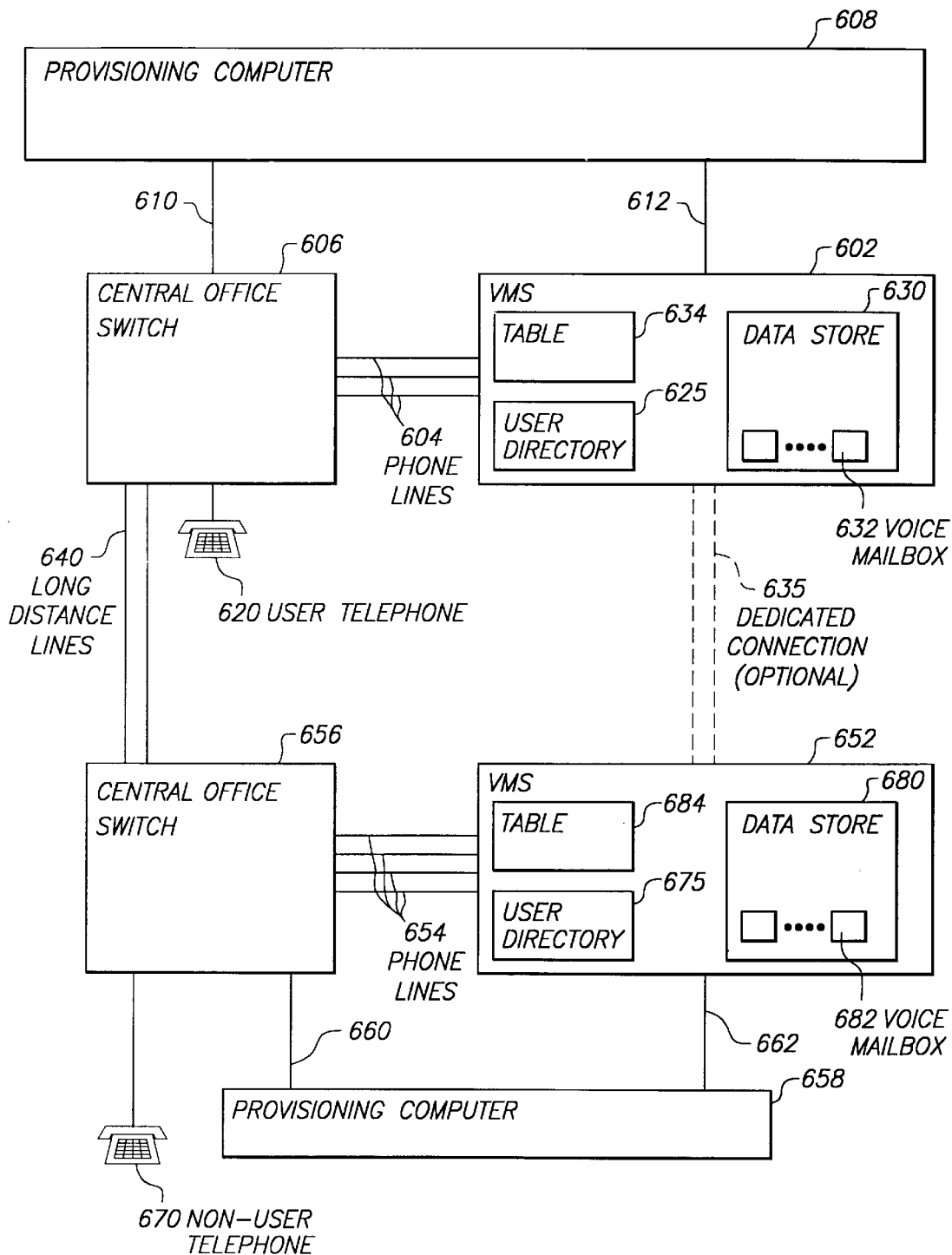
FIG. 5 illustrates a block diagram of an alternate embodiment of the present invention.

FIG. 5 illustrates a block diagram of an embodiment of the system of the invention for auto-provisioning remote non-users who are served by different central office switches and voice message systems. In FIG. 5, a first VMS 602 is coupled to a first CO 606 by a number of telephone lines 604. The first CO 606, which serves a plurality of telephones including a user telephone 620, and the first VMS 602 are both coupled to a first provisioning computer 608 via communications paths 610 and 612, respectively, in a manner similar to the system of FIG. 3. The telephone number of the user telephone 620 is registered in a user directory 625 of the first VMS 602, and is associated with a voice mailbox 632 in a data store 630 within the first VMS 602. The first VMS 602 also contains a table 634 for correlating a telephone number to a VMS associated with that telephone number.

A non-user telephone 670 is coupled to a second CO 656. The second CO 656 is coupled to a second VMS 652 by a number of telephone lines 654, and to the first CO 606 by long-distance telephone lines 640. The second CO 656 and the second VMS 652 are both coupled to a second provisioning computer 658 via communications paths 660 and 662, respectively, in a manner similar to the system of FIG. 3. The second VMS 652 also contains a table 684 for correlating a telephone number to a VMS associated with that telephone number.

In this embodiment, a voice message is transferred from a first VMS 602 to a second VMS 652 before the second VMS 652 attempts to deliver the voice message. This can be achieved by several methods. First, the second VMS 652 may be coupled to the first VMS 602 by a number of dedicated phone lines 635. The dedicated phone lines 635 are used to transmit voice messages directed to the non-user telephone 670 from the first VMS 602 to the second VMS 652. Alternatively, the dedicated lines 635 can be obviated by transferring a voice mail from the first VMS 602 to the second VMS 652 via a series of central office telephone switches. Further alternatively, the dedicated phone lines 635 can also be obviated by using a VMS networking service, such as OcteLink provided by Octel Communications Corporation of Milpitas, Calif.

Using one of the above methods, the voice message is transferred from the first VMS 602 to the second VMS 652. Then, the second VMS 652 will attempt to deliver the message and auto-provision the intended recipient. The process of auto-provisioning a remote non-user is similar to the steps performed in the preferred embodiment of the invention. Upon receiving auto-provisioning commands from the second VMS 652, the second provisioning computer 658 will send instructions to the second VMS 652 by way of the communications path 662 to create a new voice mailbox 682 in a data store 680 within the second VMS 652 for a new subscriber. When creating a voice mailbox 682, VMS 652 also adds a new entry to a user directory 675. The second provisioning computer 658 will also send instructions to the second CO 656 by way of the communications path 660 to set up call forwarding for the new subscriber. In addition, the table 684 is updated to include information regarding the new user. This information is synchronized among all the VMS systems in the network.

Figure 6:
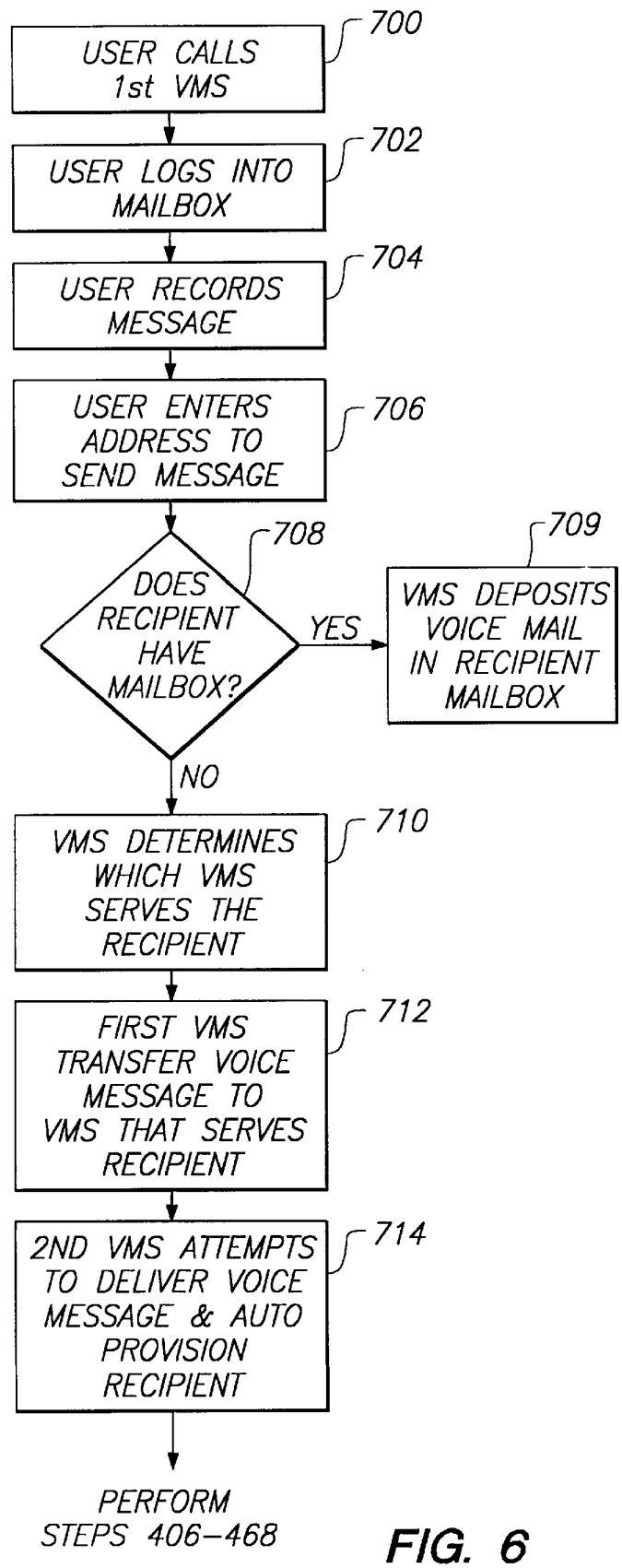
FIG. 6 shows a flow chart illustrating the function of auto-provisioning a remote telephone according to the present invention.

FIG. 6 illustrates a flow chart showing the function of auto-provisioning for a remote non-user telephone according to the present invention. The flow chart of FIG. 6 is best understood when considering it in conjunction with the block diagram of FIG. 5. A user telephone 620 calls the first VMS 602 (box 700), logs into the voice mailbox 632 assigned to the user telephone 620 (box 702), and deposits a voice message therewith (box 704). The user also enters a telephone number of an intended recipient, which is also stored in the mailbox 632 in association with the voice message (box 706). The first VMS 602 then determines whether the intended recipient is a user by searching a user directory 625 (box 708). If the intended recipient is a user, then the first VMS 602 transfers the voice message to the intended recipient's mailbox using methods known in the prior art (box 709). If the intended recipient is not a user, the first VMS 602 then determines which VMS serves the intended recipient by looking up the table 634 (box 710). Upon determining that the intended recipient is served by the second VMS 652, the first VMS 602 transmits the voice message together with the telephone number of the intended recipient to the second VMS 652 (box 712). The voice message and the telephone number can be transferred via a dedicated line 635, a series of telephone switches or OcteLink, as described above. After the voice message is transferred, the second VMS 652 will then attempt to deliver the voice message (box 715), and perform auto-provisioning steps illustrated by boxes 406–468 in FIGS. 4a and 4b, where the second VMS 652 will assist the intended recipient to acquire a voice mailbox 682 within the VMS 652, as described above.

Figure 7:
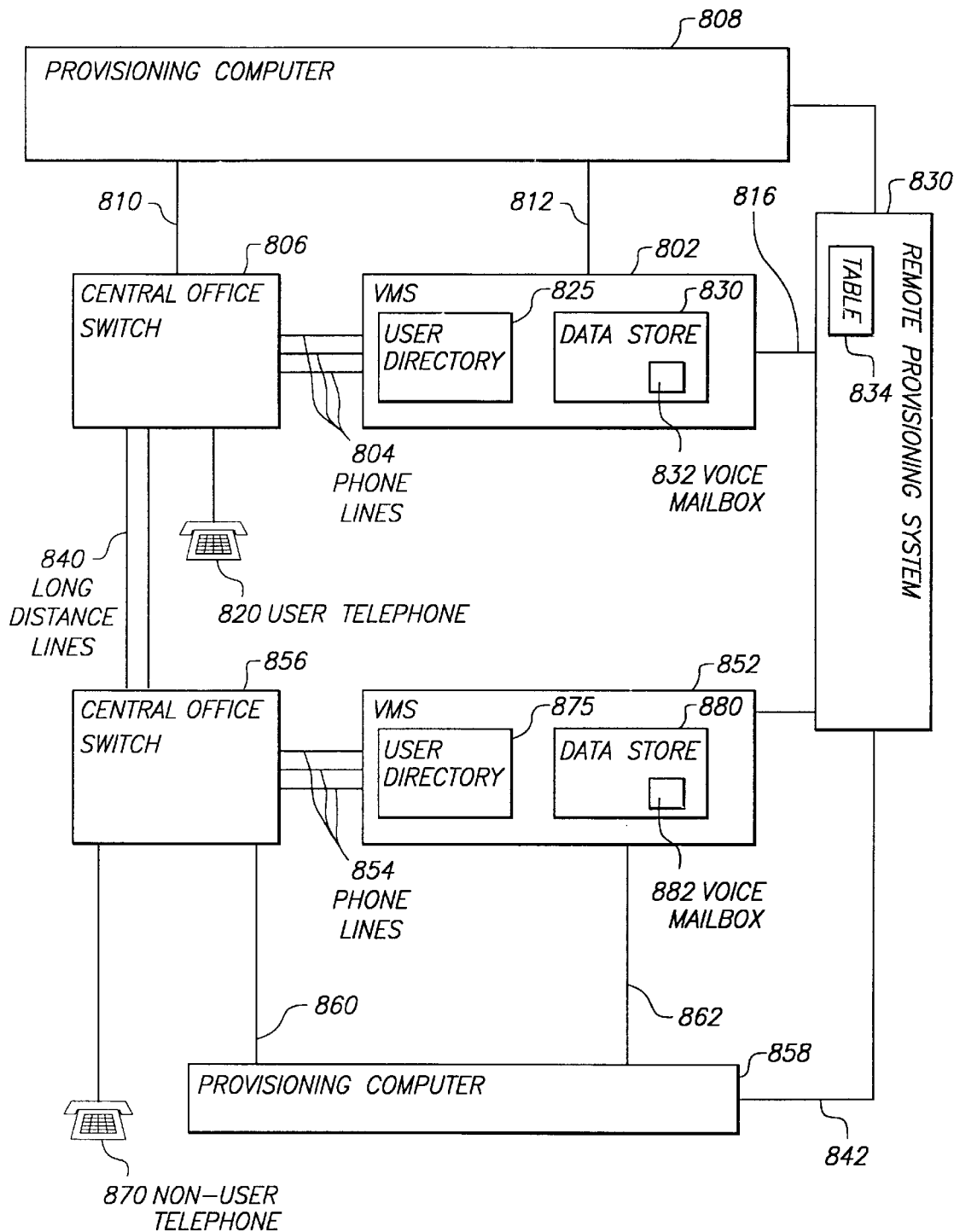
FIG. 7 shows a block diagram of a further alternate embodiment of the present invention.

FIG. 7 illustrates a block diagram of an alternate embodiment of the system of the present invention for auto-provisioning remote non-users. The system illustrated in FIG. 7 is substantially similar to the system illustrated in FIG. 5, except for the addition of a remote provisioning system (RPS) 830 which is coupled to each VMS and each provisioning computer. The RPS 830 is coupled to a first VMS 802 and a second provisioning computer 858 by communications path 816 and 842, respectively. The RPS 832 also contains a table 834 which correlates the telephone number of the remote non-user with the VMS and provisioning computer serving the remote non-user. This one table 834 is maintained by the RPS rather than having each VMS maintain its own table such as the system of FIG. 5. The remaining components and connections are fully described above and are not repeated here. Upon receiving auto-provisioning commands from the RPS 830, the second provisioning computer 858 will send instructions to a second VMS 852 by way of a communications path 862 to create a new voice mailbox 882, in a data store 880 for a new subscriber. A user directory 875 of the second VMS 852 will also be updated. The second provisioning computer 858 will also send instructions by way of the communications path 860 to a CO 856 to set up call forwarding for a new subscriber.

Figure 8:
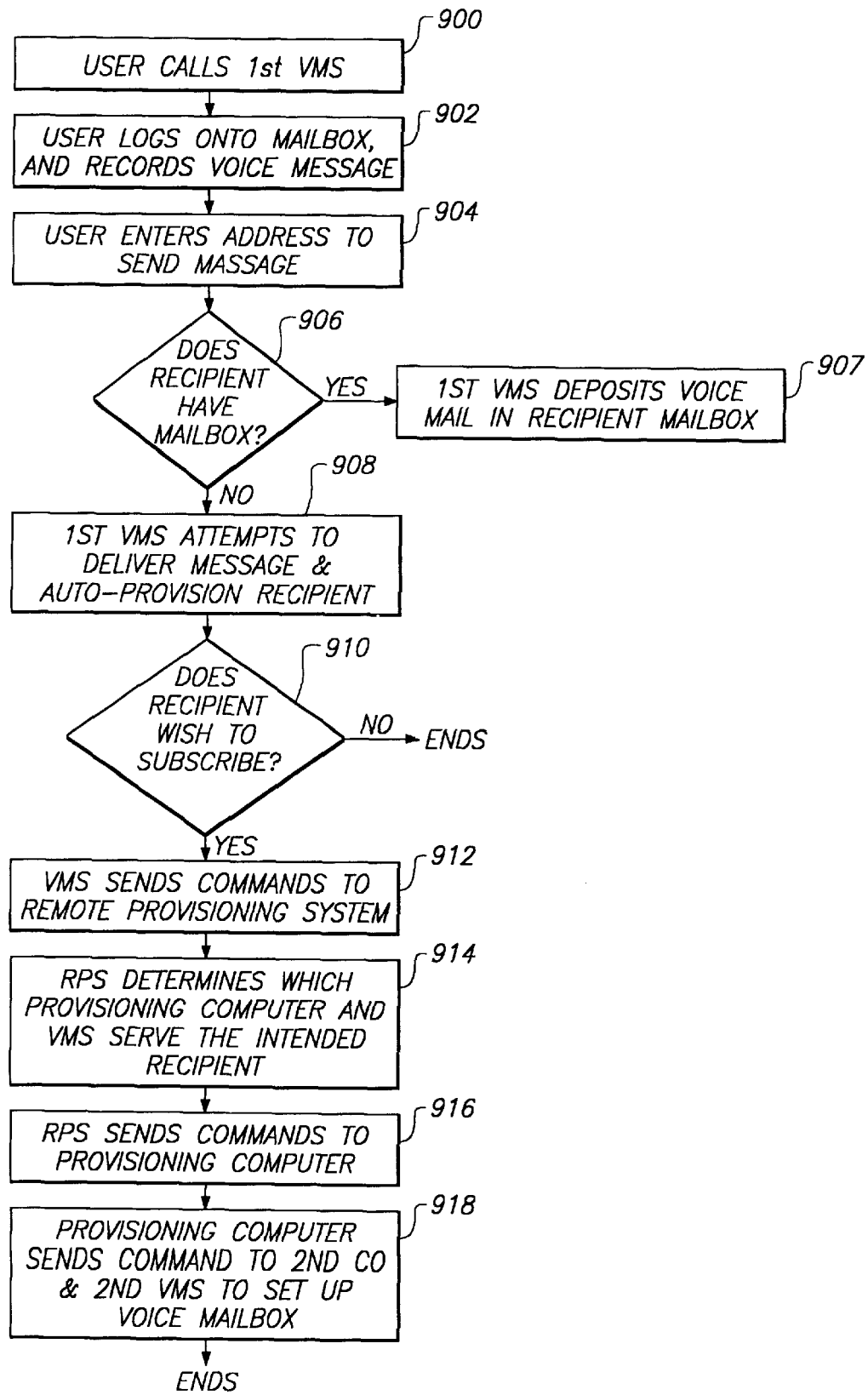
FIG. 8 shows a flow chart illustrating the function of auto-provisioning a remote telephone by using a remote provisioning system according to the present invention.

FIG. 8 illustrates a flow chart showing the function of auto-provisioning a remote non-user telephone for the embodiment illustrated in FIG. 7. The flow chart of FIG. 8 can be best understood when read in conjunction with the block diagram of FIG. 7. A user first calls a first VMS (box 900), logs on to his mailbox to record a voice message (box 902), and enters a telephone number of an intended recipient (box 904). The VMS will then search its user directory to determine if the recipient is a user (box 906). If the intended recipient is a user, the first VMS will then deposit the voice message to the recipient's mailbox (box 907). If the VMS determines that the intended recipient is a non-user, it will attempt to deliver the voice message and auto-provision the intended recipient (box 908). After successfully delivering the voice message and determining that the remote non-user wishes to subscribe (box 910), the first VMS 802 will send an auto-provisioning command to the RPS 830 (box 912). The RPS 830 then determines which VMS and CO serve the new subscriber by searching the table 834 which associates telephone numbers with voice messaging systems and provisioning computers (box 914). Upon determining that the second VMS 852 and the second provisioning computer 858 serve the new subscriber, the RPS 830 sends instructions to the second provisioning computer 858 by way of the communications path 842 (box 906). Upon receiving the command from the RPS 830, the second provisioning computer 858 will send appropriate commands to the CO 856 (box 908) and the VMS 852 (box 910), by way of the communications paths 860 and 862, respectively, to set up call forwarding and to set up the new voice mailbox 882 in the data store 880 within the VMS 852 for a new subscriber.

Figure 9:
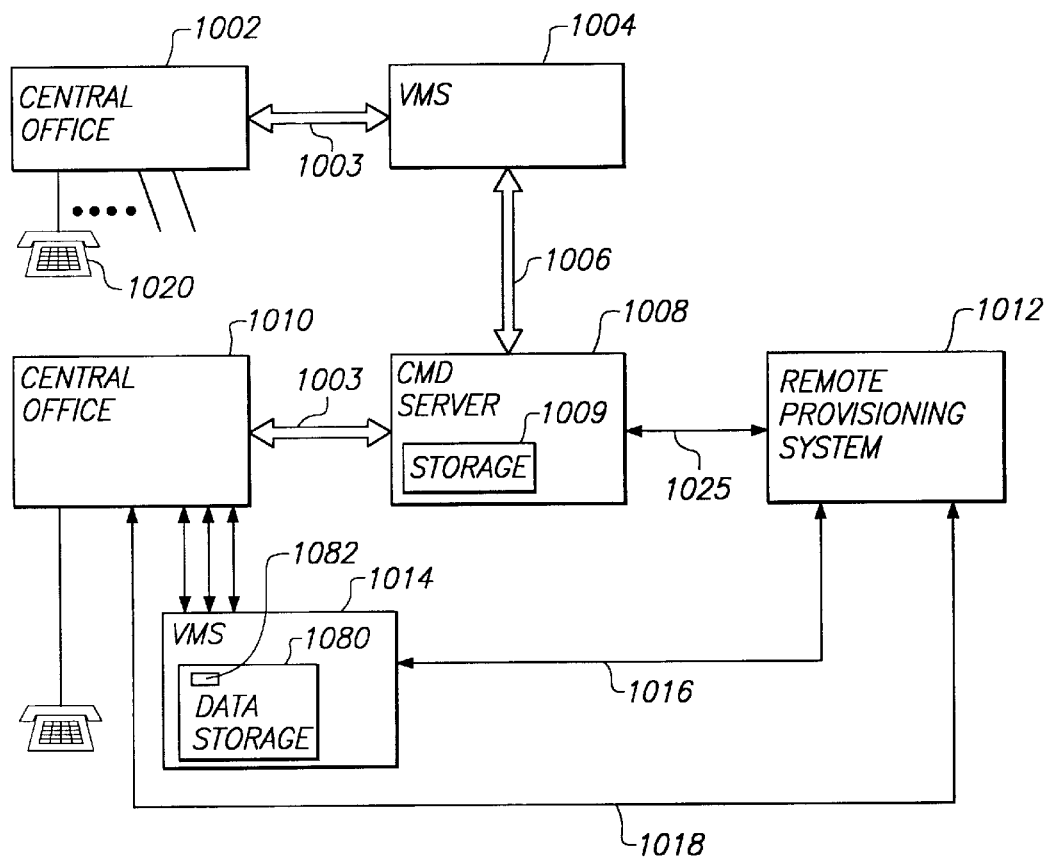
FIG. 9 shows a block diagram of yet another alternate embodiment of the present invention.

FIG. 9 illustrates a block diagram of yet another alternate embodiment of the present invention for auto-provisioning remote non-users. As shown in FIG. 9, a first VMS 1004 is coupled to a first CO 1002 by a number of telephone lines 1003. The first CO 1002 and the first VMS 1004 serve a plurality of telephones including a user telephone 1020. The first VMS 1004 is coupled to a CMD Server 1008. The CMD Server 1008 may comprise a standard personal computer equipped with voice processing board manufactured by Rhetorex or Dialogic, and a disk storage 1009. The CMD Server 1008 is not a full featured voice messaging system, but supports a network protocol for VMS 1004, thus allowing the CMD Server 1008 to receive voice messages from the VMS 1004 via the network connection 1006. The CMD Server 1008 is also connected via a network connection 1025 to a RPS 1012. The network connection 1025 may comprise an ethernet connection, or other data communication interfaces as required by the provisioning computer 1012. As other remote provisioning systems previously described, the RPS 1012 can add a mailbox 1082 to a second VMS 1014 and establish call forwarding of the new subscriber at a CO 1010. This embodiment is particularly applicable where the second VMS 1014 does not support the CMD Server 1008 with auto-provisioning capability.

Figure 10:
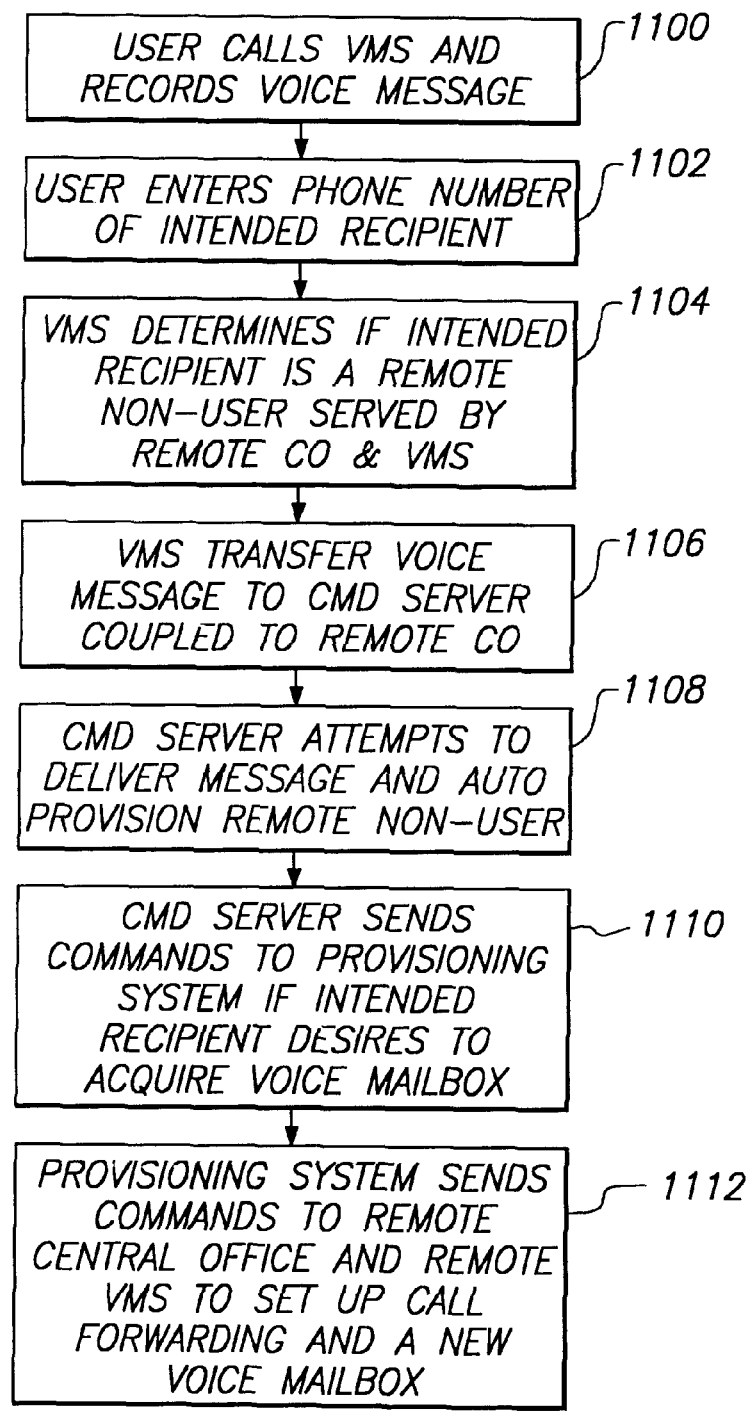
FIG. 10 shows a flow chart illustrating the function of auto-provisioning a remote telephone by using a CMD Server according to the embodiment as shown in FIG. 9.

FIG. 10 illustrates a flow chart showing the function of auto-provisioning a remote non-user telephone for the embodiment illustrated in FIG. 9. A user first calls a first VMS, logs on to his mailbox to record a voice message (box 1100), and enters a telephone number of an intended recipient (box 1102). The VMS will then determine whether the intended recipient is served by the remote 1014 and the remote CO 1010 (box 1104). If the first VMS determines that the intended recipient is served by the remote VMS 1014 and the remote CO 1010, the first VMS will transfer the voice message to the CMD Server 1008 (box 1106), which is coupled to the VMS 1014 and the CO 1010, to be stored at the disk storage 1009. The CMD Server 1008 will then attempt to deliver the voice message and auto-provision the intended recipient in the same manner as described in other embodiments (box 1108). After successfully delivering the voice message and determining that the intended recipient wishes to subscribe, the CMD Server 1008 will send an auto-provisioning command to the RPS 1012 (box 1110). Upon receiving the command from the CMD Server 1008, the RPS 1012 will send appropriate commands to the CO 1010 and the VMS 1014 (box 1112), by way of the communications paths 1016 and 1018, respectively, to set up call forwarding and to set up the new voice mailbox 1082 in a data store 1080 within the VMS 1014 for the intended recipient.

A VMS with non-user outcalling and auto-provisioning capabilities according to the present invention allows an existing VMS user to send voice messages to a telephone number of a non-user. Furthermore, when the non-user telephone is off-hook or unanswered, the VMS of the present invention will make repeated attempts to deliver the message. In addition, the present invention helps the message recipient to learn about the capabilities of voice messaging systems, and helps the message recipient, desiring to subscribe to voice messaging service, to automatically acquire a new voice mailbox. The VMS of the present invention also substantially simplifies the process of subscribing to voice messaging service by automatically establishing call forwarding and creating a voice mailbox for the new subscriber.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

What is claimed is:

1. A method of automatically transmitting a voice message from a user of a voice messaging system to an intended recipient and automatically establishing a voice mailbox for the intended recipient, comprising the steps of:
    a. recording the voice message directed to the intended recipient in the voice messaging system including storing a telephone number for the intended recipient;
    b. determining whether the intended recipient is a subscriber to the voice messaging system;
    c. transmitting the voice message to the intended message recipient;
    d. inquiring whether the intended recipient desires to become a subscriber, if the intended recipient is not a subscriber; and
    e. automatically configuring the telephone number to become a subscriber, if the intended recipient desires to become a subscriber.

2. The method according to claim 1, wherein the step of automatically configuring comprises:
    a. transmitting an instruction to a central office switch which serves the telephone number, to set up call forwarding for the telephone number; and
    b. creating a voice mailbox for the telephone number in the voice messaging system.

3. The method according to claim 1, wherein the step of configuring comprises:
    a. transmitting the telephone number to a provisioning computer coupled to the voice messaging system;
    b. transmitting a first instruction from the provisioning computer to a central office switch, for instructing the central office switch to set up call forwarding for the telephone number; and
    c. transmitting a second instruction from the provisioning computer to the voice messaging system, for instructing the voice messaging system to create a voice mailbox for the telephone number.

4. The method according to claim 1, wherein the step of automatically configuring comprises:
    a. transmitting a first instruction to a remote provisioning system, the first instruction incorporating the telephone number;
    b. determining a distant central office switch and a distant voice messaging system associated with the telephone number;
    c. determining a distant provisioning computer associated with the distant central office switch and the distant voice messaging system;
    d. transmitting a second instruction from the remote provisioning system to the distant provisioning computer for establishing the telephone as a subscriber;
    e. transmitting a third instruction from the distant provisioning computer to the distant central office switch for instructing the distant central office switch to set up call forwarding for the telephone number; and
    f. transmitting a fourth instruction from the distant provisioning computer to the distant voice messaging system for instructing the distant voice messaging system to create a voice mailbox for the telephone number.

5. The method according to claim 1, wherein the step of automatically configuring comprises:
    a. determining a distant central office switch and a distant voice messaging system associated with the telephone number;
    b. transmitting a first instruction to a server coupled to the distant central office switch, the first instruction incorporating the telephone number;
    c. transmitting a second instruction from the server to a distant provisioning computer if the intended recipient desires to become a subscriber; and
    d. establishing call forwarding for the telephone number at the distant central office; and
    e. establishing a new voice mailbox for the telephone number at the distant voice messaging system.

6. The method according to claim 1, wherein the step of recording further comprises:

a. translating the voice message into machine readable data; and b. storing the machine readable data in a data store corresponding to a telephone number of the user.

7. The method according to claim 1, wherein the step of transmitting is periodically repeated until a signal is received indicating a successful transmission.

8. The method according to claim 1, wherein the step of transmitting comprises:

a. periodically telephoning the intended recipient until phone connection is established; and b. playing the voice message after phone connection is established.

9. The method according to claim 1, wherein the step of transmitting comprises:

a. determining that the voice message has not been sent;

b. attempting to establish a connection with the intended recipient;

c. determining that a connection is established with a live person;

d. transmitting a pre-recorded message offering the live person the option to receive the voice message; and e. playing the voice message should the live person choose to receive the message.

10. The method according to claim 1, wherein the step of transmitting comprises:

a. determining that the voice message has not been sent;

b. attempting to establish a connection with the intended recipient;

c. determining that a connection is established with an answering machine; and d. playing the voice message for recording in the answering machine.

11. A method of automatically transmitting a voice message from a user of a proximal voice messaging system to an intended recipient and automatically establishing a voice mailbox for the intended recipient at a distant voice messaging system, comprising the steps of:

a. recording the voice message directed to the intended recipient in the proximal voice messaging system and storing a telephone number for the intended recipient;

b. determining that the telephone number is served by a distant central office switch, the distant central office switch coupled to a distant voice messaging system;

c. determining that the intended recipient is a non-subscriber to the distant voice messaging system;

d. inquiring whether the intended recipient desires to acquire a voice mailbox, if the intended recipient is a non-subscriber; and e. automatically configuring the telephone number to become a subscriber, if the intended recipient does desire to acquire a voice mailbox.

12. The method according to claim 11, wherein the step of automatically configuring comprises:

a. transmitting an instruction to the distant central office switch to set up call forwarding for the telephone number; and b. creating a voice mailbox for the telephone number at the distant voice messaging system.

13. The method according to claim 11, wherein the step of automatically configuring comprises:

a. determining a distant provisioning computer coupled to the distant central office switch and to the distant voice messaging system;

b. transmitting a first instruction to the distant provisioning computer, the first instruction including the telephone number;

c. transmitting a second instruction from the distant provisioning computer to the distant central office switch, for instructing the distant central office switch to set up call forwarding for the telephone number; and d. transmitting a third instruction from the distant provisioning computer to the distant voice messaging system for instructing the distant voice messaging system to create a voice mailbox for the telephone number.

14. The method according to claim 11, wherein the step of automatically configuring comprises:

a. determining a distant provisioning computer coupled to the distant central office switch and to the distant voice messaging system;

b. transmitting a first instruction to a remote provisioning system, the first instruction including the telephone number;

c. transmitting a second instruction from the remote provisioning system to the distant provisioning computer, the second instruction including the telephone number;

d. transmitting a third instruction from the distant provisioning computer to the distant central office switch to set up call forwarding for the telephone number; and e. transmitting a fourth instruction from the distant provisioning computer to the distant voice messaging system to create a voice mailbox for the telephone number.

15. The method according to claim 11, further comprising the step of transferring the voice message to a server coupled to the remote central office and the distant provisioning computer.

16. The method according to claim 15, wherein the step of automatically configuring comprises:

a. transmitting the voice message and a first instruction to the server, the first instruction including the telephone number;

b. transmitting a second instruction from the server to a provisioning means if the intended recipient desires the voice mailbox;

c. establishing call forwarding for the telephone number at the distant central office; and d. establishing a voice mailbox for the telephone number at the distant voice messaging system.

17. The method according to claim 11, further comprising the step of transferring the voice message to the distant voice messaging system.

18. The method according to claim 17, wherein the step of configuring comprises:

a. transmitting the telephone number from the local voice messaging system to the distant voice messaging system;

b. transmitting an instruction from the distant voice messaging system to the distant central office switch for instructing the distant central office switch to set up call forwarding for the telephone number; and c. establishing a voice mailbox at the distant voice messaging system.

19. A method of automatically establishing voice messaging service for a telephone number, comprising:

a. transmitting the telephone number to a provisioning computer;

b. transmitting a first instruction from the provisioning computer to a central office switch, for instructing the central office switch to set up call forwarding for the telephone number; and c. transmitting a second instruction from the provisioning computer to a voice messaging system coupled to the central office switch, for instructing the voice messaging system to create a voice mailbox for the telephone number.

20. A method of automatically establishing voice messaging service for a telephone number at a distant voice messaging system, comprising the steps of:

a. transmitting the telephone number to a remote provisioning system;

b. determining a distant central office switch and the distant voice messaging system associated with the telephone number;

c. determining a distant provisioning computer associated with the distant central office switch and the distant voice messaging system;

d. transmitting a first instruction from the remote provisioning system to the distant provisioning computer for establishing the telephone as a subscriber;

e. transmitting a second instruction from the distant provisioning computer to the distant central office switch for instructing the distant central office switch to set up call forwarding for the telephone number; and f. transmitting a third instruction from the distant provisioning computer to the distant voice messaging system for instructing the distant voice messaging system to create a voice mailbox for the telephone number.

21. A method of automatically establishing voice messaging service for a telephone number at a distant voice messaging system, comprising the steps of:

a. transmitting the telephone number from a proximal voice messaging system to the distant voice messaging system;

b. transmitting an instruction from the distant voice messaging system to a distant central office switch, for instructing the distant central office switch to set up call forwarding for the telephone number; and c. establishing a voice mailbox at the distant voice messaging system.

22. A method of automatically establishing voice messaging service for a telephone number at a distant voice messaging system, comprising the steps of:

a. transmitting the telephone number to a server;

b. transmitting auto-provisioning instructions from the server to a distant provisioning computer to set up call forwarding for the telephone number; and c. establishing a voice mailbox at the distant voice messaging system.

23. An apparatus for automatically delivering a voice mail message and for automatically establishing a voice mailbox for an intended recipient, comprising:

a. a storage device for storing a voice message from a sender in association with a telephone number of the intended recipient;

b. a comparing unit for determining whether the telephone number is for a subscriber or a non-subscriber;

c. an interactive query system coupled to the comparing unit for determining whether the non-subscriber desires a voice mailbox, if the telephone number is for a non-subscriber; and d. a provisioning system for automatically establishing a voice mailbox and forwarding links, if the non-subscriber does desire a voice mailbox.

24. The apparatus according to claim 23, wherein the provisioning system comprises a provisioning computer coupled to a central office switch serving the telephone number for transmitting instructions to set up call forwarding for the telephone number.

25. The apparatus according to claim 24, wherein the provisioning computer is further coupled to a voice messaging system for transmitting instructions to set up a voice mailbox for the telephone number.

26. The apparatus according to claim 23, wherein the provisioning system comprises:

a. a server coupled to a central office switch serving the telephone number for receiving and delivering the voice message; and b. a provisioning computer for receiving auto-provisioning instructions from the server when the non-subscriber desires the voice mailbox, wherein the provisioning computer establishes call forwarding for the telephone number at the central office switch and the voice mailbox at a voice message system.

27. The apparatus according to claim 23, wherein the provisioning system comprises:

a. a proximal voice messaging system coupled to receive from a proximal central office switch the voice message and the telephone number;

b. a remote provisioning system coupled to receive from the proximal voice messaging system a communication incorporating the telephone number;

c. a distant provisioning computer coupled to receive from the remote provisioning system instructions for establishing a voice mailbox;

d. a distant voice messaging system coupled to receive from the distant provisioning computer instructions for creating a voice mailbox; and e. a distant central office switch coupled to the distant provisioning computer to receive instructions for establishing call forwarding to the voice messaging system.

28. The apparatus according to claim 23, wherein the provisioning system comprises:

a. a proximal voice messaging system coupled to receive from a proximal central office switch the voice message and the telephone number;

b. a distant voice messaging system coupled to receive from the proximal voice messaging system a communication incorporating the telephone number and the voice message;

c. a distant provisioning computer coupled bi-directionally to receive from the distant voice messaging system an instruction for configuring a new voice mailbox for the telephone number, and to transmit to the distant voice messaging system a first instruction for creating a new voice mailbox for the telephone number; and d. a distant central office switch coupled to receive from the distant provisioning computer a second instruction for setting up call forwarding for the telephone number.

29. The apparatus according to claim 23, wherein the interactive query system comprises:

a. means for transmitting a message requesting that the non-user recipient provide information regarding acquisition of a voice mailbox; and b. means for receiving and reading the information.

30. The apparatus according to claim 23, further comprising:
   a. an automatic dialing system coupled to the storage device for dialing the telephone number repeatedly until the voice message is delivered;
   b. means for determining coupled to the automatic dialing system for determining if a dialed number is answered by a selective one of a live person and an answering machine; and
   c. means for transmitting coupled to the automatic dialing system and to the means for determining for transmitting the voice message after the means for determining determines that the dialed number is answered.

31. The apparatus according to claim 30, further comprising:
   a. a detector coupled to the means for determining for detecting one of a busy telephone status and a ring-no-answer telephone status;
   b. a counter coupled to the automatic dialing system for counting a number of failed transmission attempts;
   c. means for discontinuing automatic dialing coupled to the counter and to the automatic dialing system for disabling the automatic dialing system should the number of failed transmission attempts exceed a predetermined number; and
   d. means for notifying coupled to the means for discontinuing for notifying the sender that the voice message was not transmitted if the automatic dialing system is disabled.

* * * * *

UNITED STATES PATENT AND TRADEMARK OFFICE
CERTIFICATE OF CORRECTION

PATENT NO. : 6,097,791
DATED : August 1, 2000
INVENTOR(S) : David Ladd et al.

It is certified that error appears in the above-identified patent and that said Letters Patent is hereby corrected as shown below:

<u>Title page,</u>
Under References Cited [56], delete "5,793,858  9/1998 Meubus et al.  379/210" add -- 5,793,858  8/1998 Meubus et al.  379/210 --.
Under References Cited [56], delete "At&T" after "Welsh,". insert -- AT&T" after "Welsh,".

Signed and Sealed this

Eighteenth Day of December, 2001

Attest:

JAMES E. ROGAN
*Attesting Officer*    *Director of the United States Patent and Trademark Office*